(12) United States Patent  
Seawel

(10) Patent No.: US 8,403,343 B1  
(45) Date of Patent: Mar. 26, 2013

(54) SHOPPING CART ATTACHMENT DEVICE

(76) Inventor: Suzanne M. Seawel, Ballwin, MO (US)

( * ) Notice: Subject to any disclaimer, the term of this patent is extended or adjusted under 35 U.S.C. 154(b) by 296 days.

(21) Appl. No.: 12/855,638

(22) Filed: Aug. 12, 2010

(51) Int. Cl.
*B62D 39/00* (2006.01)

(52) U.S. Cl. .................................. 280/33.992

(58) Field of Classification Search ............ 280/33.992, 280/763.1, 639, 35; 403/54, 84; 16/405, 16/411
See application file for complete search history.

(56) References Cited

U.S. PATENT DOCUMENTS

| | | | |
|---|---|---|---|
| 6,702,313 B2 * | 3/2004 | Forshee et al. ............. | 280/304.1 |
| 7,226,059 B1 * | 6/2007 | Samuels ................... | 280/33.992 |
| D570,676 S | 6/2008 | Hager | |
| 7,380,803 B2 | 6/2008 | Thomas | |
| 2005/0206103 A1 | 9/2005 | Schmidt et al. | |
| 2006/0244226 A1 | 11/2006 | Ondrasik | |
| 2007/0018425 A1 * | 1/2007 | Gilmore et al. ............ | 280/288.4 |

* cited by examiner

*Primary Examiner* — John Walters
*Assistant Examiner* — James Triggs

(57) ABSTRACT

A shopping cart attachment device for securing a shopping cart to a vehicle featuring a clamp base having a generally U-shaped cross section formed from a first panel and a second panel connected together, the base snugly wraps around an end of the shopping cart; an arm pivotally attached to the base via a pivot mechanism, the pivot mechanism allows the arm to pivot side-to-side, the arm has a first end and a second end, the first end is engaged in the pivot mechanism and the second end extends outwardly from the base and pivot mechanism; a pad component disposed on the second end of the arm; and a hook extending upwardly from the pad component and second end of the arm, the hook functions to hook onto a part of a vehicle.

6 Claims, 5 Drawing Sheets

# SHOPPING CART ATTACHMENT DEVICE

FIELD OF THE INVENTION

The present invention is directed to an accessory for shopping carts, more particularly to a device for securing a shopping cart to a vehicle to prevent the cart from rolling away or scratching the vehicle.

BACKGROUND OF THE INVENTION

Runaway shopping carts in parking lots can cause damage to nearby vehicles and make it difficult for users to unload items (and children) from the shopping cart into the vehicle. The present invention features a shopping cart attachment device that allows a user to secure a shopping cart to his/her vehicle. The device of the present invention prevents a user from having to secure the shopping cart with one hand while unloading items or rest the shopping cart on the car, which may cause damage. The device may also help reduce damage to other vehicles caused by runaway carts.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
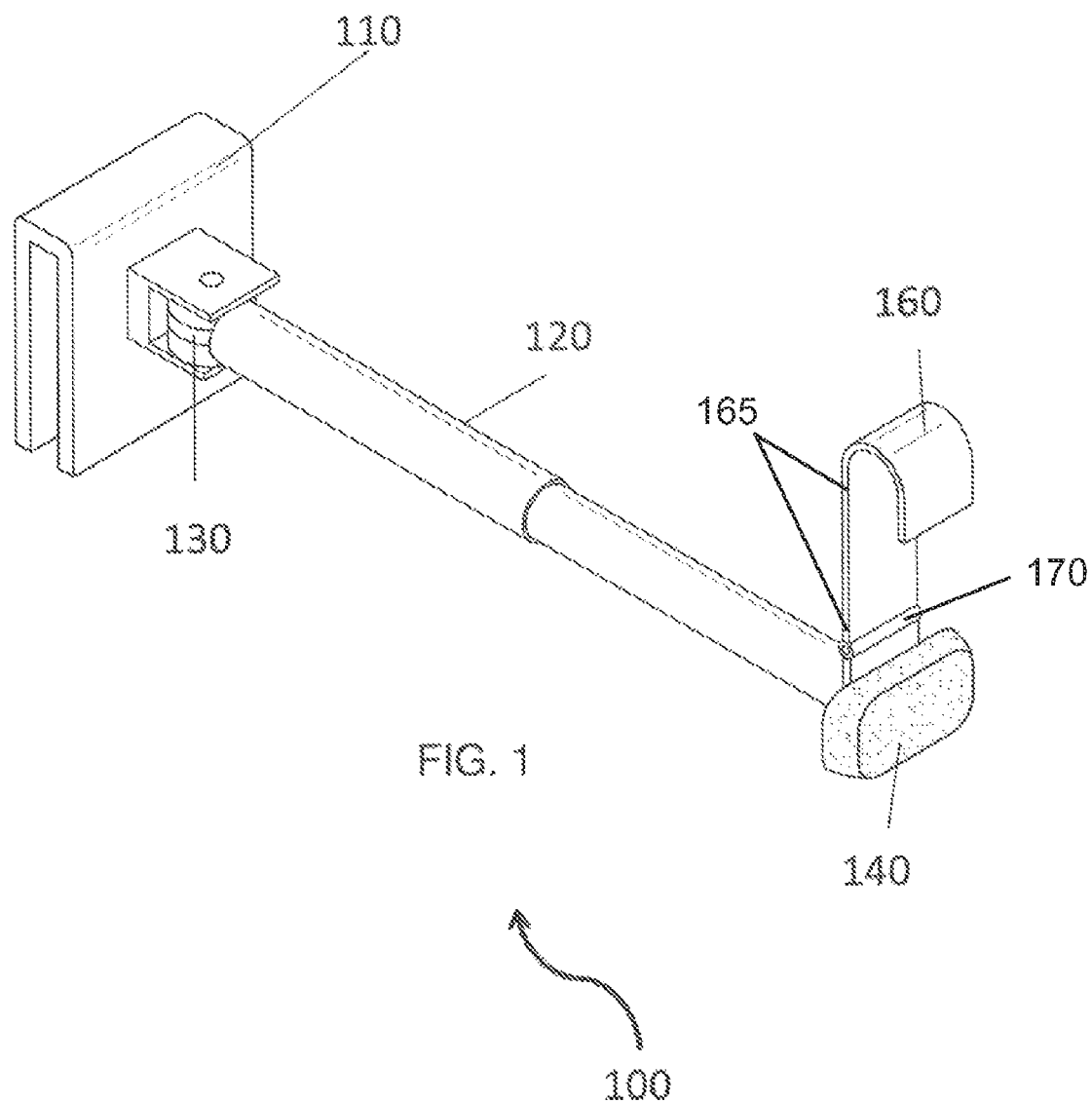
FIG. 1 is a perspective view of the shopping cart attachment device of the present invention.
Figure 2:
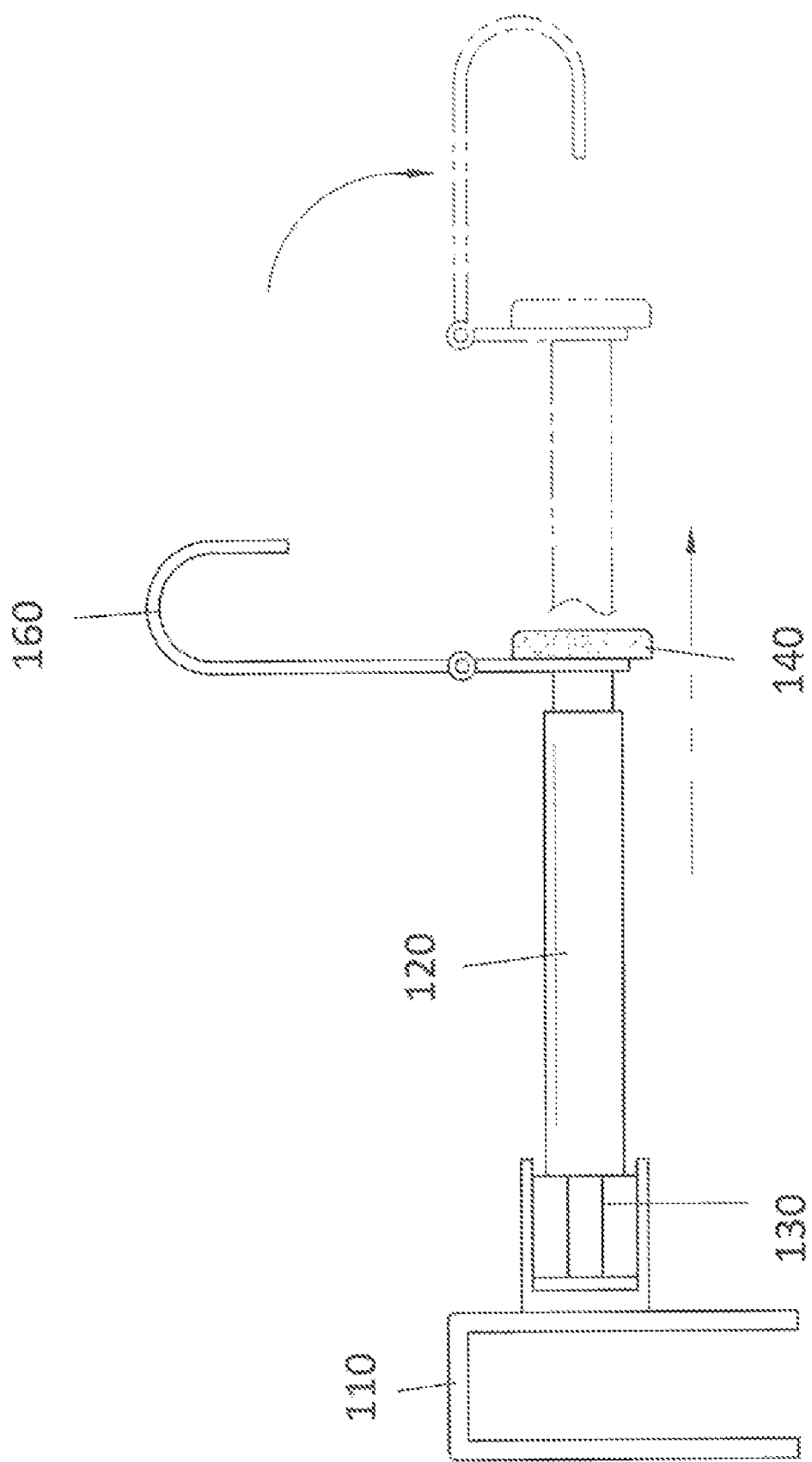
FIG. 2 is a side view of the shopping cart attachment device of FIG. 1.
Figure 3:
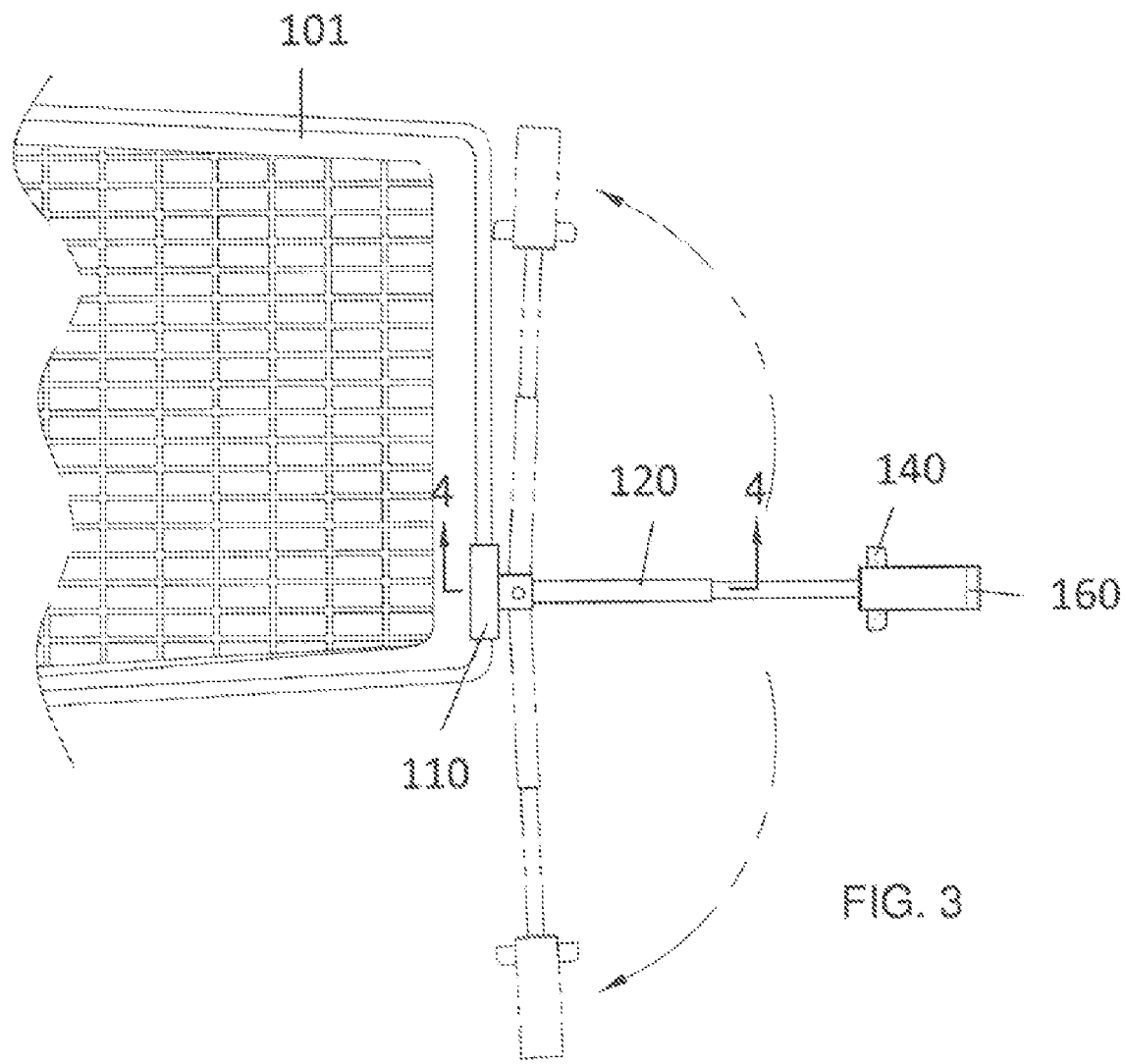
FIG. 3 is a top view of the shopping cart attachment device of FIG. 1.
Figure 4:
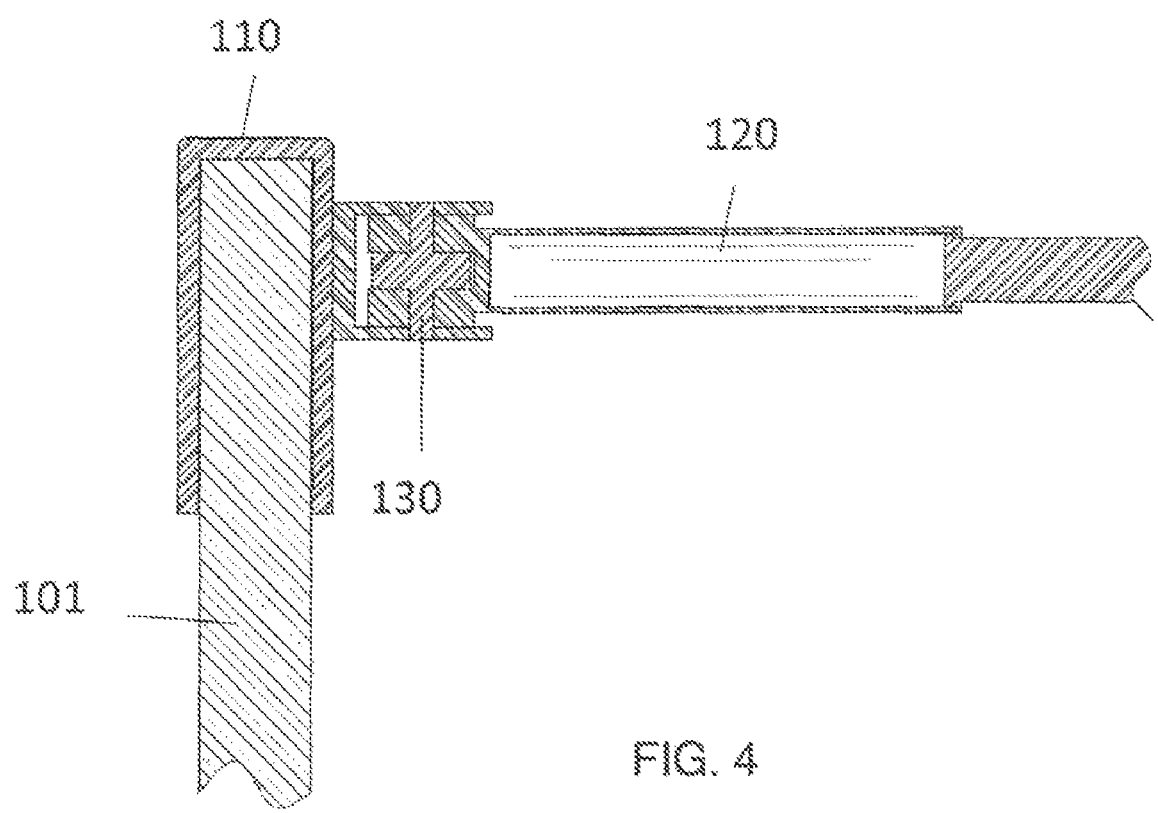
FIG. 4 is a cross sectional view of the shopping cart attachment device of FIG. 3.
Figure 5:
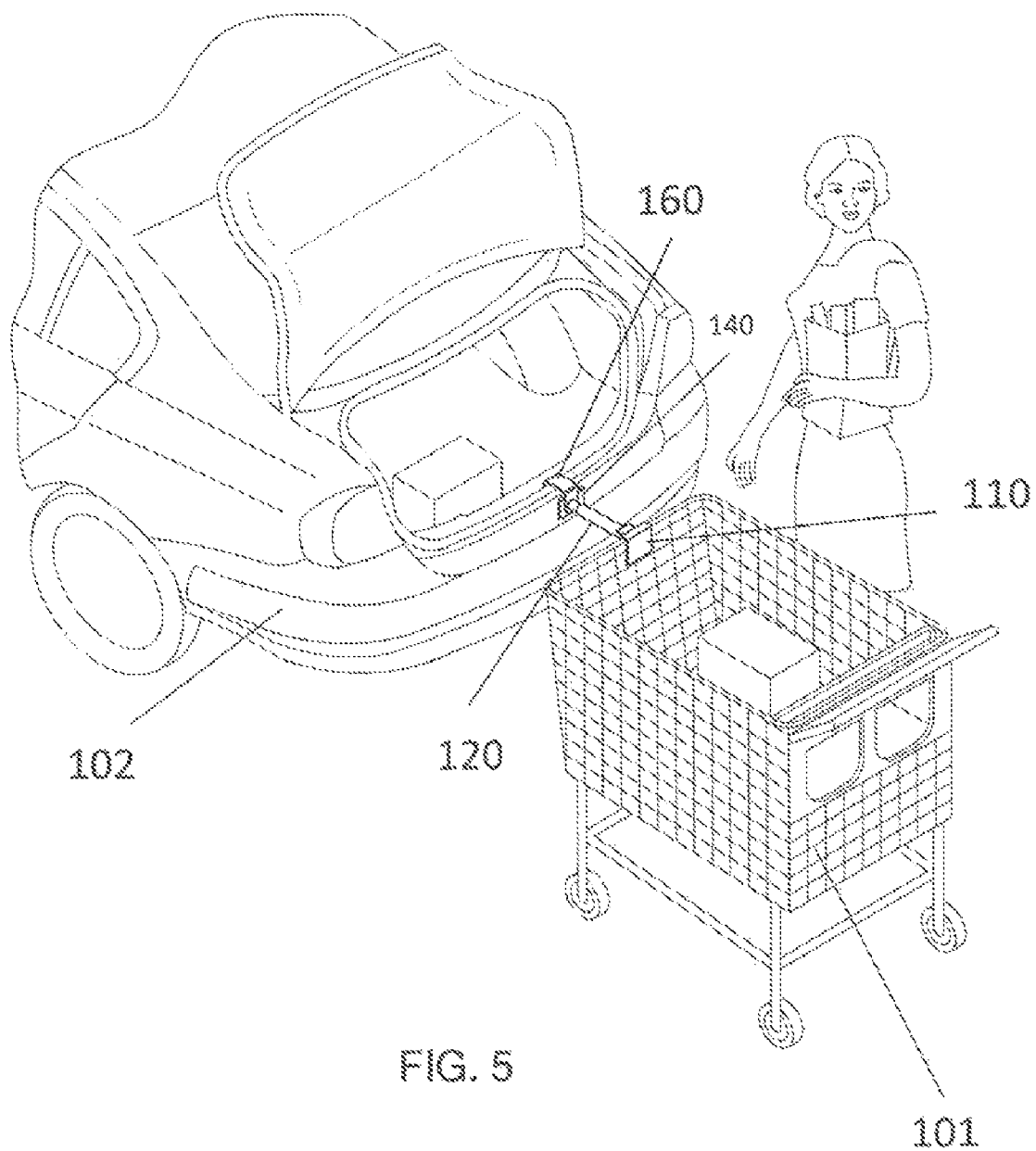
FIG. 5 is an in-use view of the shopping cart attachment device of the present invention.

Referring now to FIGS. 1-5, the present invention features a shopping cart attachment device 100 that allows a user to secure a shopping cart 101 to his/her vehicle 102. The shopping cart attachment device 100 of the present invention prevents a user from having to secure the shopping cart 101 with one hand while unloading items or rest the shopping cart on the vehicle 102, which may cause damage. The shopping cart attachment device 100 may also help reduce damage to other vehicles caused by runaway carts.

The shopping cart attachment device 100 comprises a base 110 for securing to an end of a shopping cart 101. The base 110 may be a clamp, for example the base 110 may have a generally U-shaped cross section formed from a first panel and a second panel connected together on each of the panel's top end. The base 110 snugly wraps around the end of the shopping cart 101. The base 110 is not limited to the aforementioned configuration. For example, in some embodiments, the base 110 is a latch, a hook-and-loop fastener device, a clip, a hook, the like, or a combination thereof. In some embodiments, shopping carts 101 are manufactured with the base 110 fixedly attached (e.g., the whole device 100 is pre-attached during the manufacturing process).

Pivotally attached to the base 110 (e.g., the front panel of the base 110) via a pivot mechanism 130 is an arm 120. The arm 120 has a first end and a second end, the first end engaged in the pivot mechanism 130 and the second end extending outwardly from the base 110 and pivot mechanism 130. The arm 120 may be adjustable in length, for example the arm 120 may be constructed from two or more telescopic poles. The pivot mechanism 130 allows the pivoting of the arm 120 side-to-side. In some embodiments, the pivot mechanism 130 allows the pivoting of the arm 120 up-and-down. In some embodiments, the pivot mechanism 130 allows the pivoting of the arm 120 up-and-down and side-to-side. The pivot mechanism 130 allows the device to easily connect the cart 101 to the vehicle 102.

Disposed on the second end of the arm 120 is a pad component 140. The pad component 140 may be a foam pad, a gel pad, a rubber pad, a cloth pad, or the like. The pad component 140 helps prevent the device 100 from scratching the vehicle 102 when in use. Extending upwardly from the pad component 140 and second end of the arm 120 is a hook 160. The hook has a shaft 165 with a second hinge 170 disposed on the shaft at a location beyond the pad, wherein the hook extends upwardly from the pad component a second end of the arm. For example, the hook may extend upwardly from the second end of the arm and pad component 140 at an angle of between about 60 to 120 degrees (e.g., 90 degrees, 100 degrees, 115 degrees, etc.) with respect to the arm 120. The hook 160 functions to hook onto a part of the vehicle, for example the trunk of the vehicle or inside the door of the vehicle. In some embodiments, the hook 160 is replaced with a strap.

The device 100 of the present invention may be constructed in a variety of materials. For example, in some embodiments, the device 100 is constructed from a durable plastic, a metal, a rubber, a foam, a wood, the like, or a combination thereof. The device 100 may be constructed in a variety of sizes. Generally, the device 100 can fit universally to shopping carts. In some embodiments, the arm 120 is between about 8 to 12 inches in length as measured from the first end to the second end. In some embodiments, the arm 120 is between about 12 to 16 inches in length as measured from the first end to the second end. In some embodiments, the arm 120 is between about 16 to 20 inches (e.g., 18 inches) in length as measured from the first end to the second end. In some embodiments, the arm 120 is more than about 20 inches in length.

As used herein, the term "about" refers to plus or minus 10% of the referenced number. For example, an embodiment wherein the arm 120 is about 20 inches in length includes an arm 120 that is between 18 and 22 inches in length.

The disclosures of the following U.S. patents are incorporated in their entirety by reference herein: U.S. Pat. Application No. 2007/0018425; U.S. Pat. Application No. 2005/0206103; U.S. Pat. Application No. 2006/0244226; U.S. Pat. No. 6,702,313; U.S. Pat. No. 7,380,803; U.S. Design Pat. No. D570, 676.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A shopping cart attachment device comprising:
   (a) a base for securing to a shopping cart, the base is a clamp having a generally U-shaped cross section formed from a first panel and a second panel connected together, the base wraps around an end of the shopping cart;
   (b) an arm pivotally attached to the base via a pivot mechanism, the pivot mechanism restricts the arm to pivot side-to-side, the arm has a first end and a second end, the first end is engaged in the pivot mechanism and the second end extends outwardly from the base and pivot mechanism;
   (c) a pad component disposed on the second end of the array,
   (d) a hook having a shaft with a second hinge disposed on the shaft at a location beyond the pad, wherein the hook extends upwardly from the pad component and second end of the arm, the hook is positioned at an angle with respect to the arm, the hook functions to hook onto a part of a vehicle, wherein the part of the vehicle is a rim of a trunk of the vehicle
   wherein when the hook is bent forward about the second hinge, the hook and the pad form a clamp around the rim of the trunk of the vehicle and effective to prevent the shopping cart device from coming loose when it is pushed towards the vehicle or pulled away from the trunk of the vehicle.

2. The shopping cart attachment device of claim 1, wherein the arm is between about 8 to 20 inches in length as measured from the first end to the second end.

3. The shopping cart attachment device of claim 1, wherein the arm is adjustable in length.

4. The shopping cart attachment device of claim 1, wherein the pad component is a foam pad, a gel pad, a rubber pad, or a cloth pad.

5. The shopping cart attachment device of claim 1, wherein the hook is replaced with a strap.

6. The shopping cart attachment device of claim 1, wherein the angle is between about 60 to 120 degrees.

* * * * *